(12) United States Patent
Lozitsky et al.

(10) Patent No.: US 11,346,451 B2
(45) Date of Patent: May 31, 2022

(54) NUT LOCKING COUPLING FOR ACTUATED VALVE

(71) Applicant: Swagelok Company, Solon, OH (US)

(72) Inventors: Vyatseslav Lozitsky, Parma, OH (US); Robert Scott Headings, Chesterland, OH (US)

(73) Assignee: SWAGELOK COMPANY, Solon, OH (US)

( * ) Notice: Subject to any disclaimer, the term of this patent is extended or adjusted under 35 U.S.C. 154(b) by 59 days.

(21) Appl. No.: 16/858,797

(22) Filed: Apr. 27, 2020

(65) Prior Publication Data

US 2020/0347944 A1 Nov. 5, 2020

Related U.S. Application Data

(60) Provisional application No. 62/842,120, filed on May 2, 2019.

(51) Int. Cl.
  *F16K 5/06* (2006.01)
  *F16K 31/163* (2006.01)

(52) U.S. Cl.
  CPC ........ *F16K 5/0647* (2013.01); *F16K 31/1635* (2013.01)

(58) Field of Classification Search
  CPC .................. F16K 5/0647; F16K 31/1635
  See application file for complete search history.

(56) References Cited

U.S. PATENT DOCUMENTS

| 3,237,528 | A | * | 3/1966 | Rose | F16K 31/12 |
| | | | | | 91/409 |
| 3,334,859 | A | * | 8/1967 | Raymond, Jr. | F16K 31/043 |
| | | | | | 251/129.12 |
| 3,429,553 | A | | 2/1969 | Smith et al. | |
| 3,964,514 | A | * | 6/1976 | Manoogian | F16K 11/078 |
| | | | | | 137/625.17 |
| 4,705,063 | A | * | 11/1987 | Robinson | F16K 5/08 |
| | | | | | 137/315.03 |
| 4,719,939 | A | | 1/1988 | Killian | |

(Continued)

FOREIGN PATENT DOCUMENTS

| CN | 103836224 | 1/2013 |
| DE | 2065199 | 11/1972 |
| DE | 4104318 | 8/1992 |

OTHER PUBLICATIONS

International Search Report and Written Opinion from PCT/US2020/030023 dated Jul. 21, 2020.

*Primary Examiner* — Eric Keasel
(74) *Attorney, Agent, or Firm* — Calfee, Halter & Griswold LLP

(57) ABSTRACT

An actuated valve assembly includes a valve, an actuator, and a nut retention sleeve. The nut retention sleeve has a first bore portion sized to closely receive and rotate with a portion of a coupling member extending from the actuator and a second bore portion sized to closely receive and rotate with at least a portion of a stem nut assembled with a valve stem of the valve. The nut retention sleeve is slideable between a nut retaining position in which the second bore portion engages the stem nut to rotationally fix the stem nut with the coupling member, and a nut adjusting position in which the second bore portion is disengaged from the stem nut to permit rotation of the stem nut on the valve stem.

20 Claims, 5 Drawing Sheets

(56) References Cited

U.S. PATENT DOCUMENTS

| | | | |
|---|---|---|---|
| 4,917,141 A | | 4/1990 | Brunel et al. |
| 5,257,771 A | | 11/1993 | Portis et al. |
| 5,440,969 A | | 8/1995 | Shin |
| 5,529,087 A | | 6/1996 | Berry |
| 5,634,486 A | | 6/1997 | Hatting et al. |
| 5,984,353 A | | 11/1999 | Rasmussen |
| 6,019,129 A | * | 2/2000 | Taha ............... F16K 35/022 137/553 |
| 6,572,076 B1 | | 6/2003 | Appelford |
| 6,629,683 B2 | * | 10/2003 | Wang ............... F16K 41/02 251/315.1 |
| 8,061,681 B2 | | 11/2011 | Dalluge |
| 8,282,073 B2 | * | 10/2012 | Grewal ............. F16K 35/06 251/285 |
| 8,424,838 B2 | | 4/2013 | Dolenti |
| 8,579,249 B2 | | 11/2013 | McCarty |
| 8,910,658 B2 | | 12/2014 | Adams |
| 9,816,626 B1 | | 11/2017 | DeBlieck |

\* cited by examiner

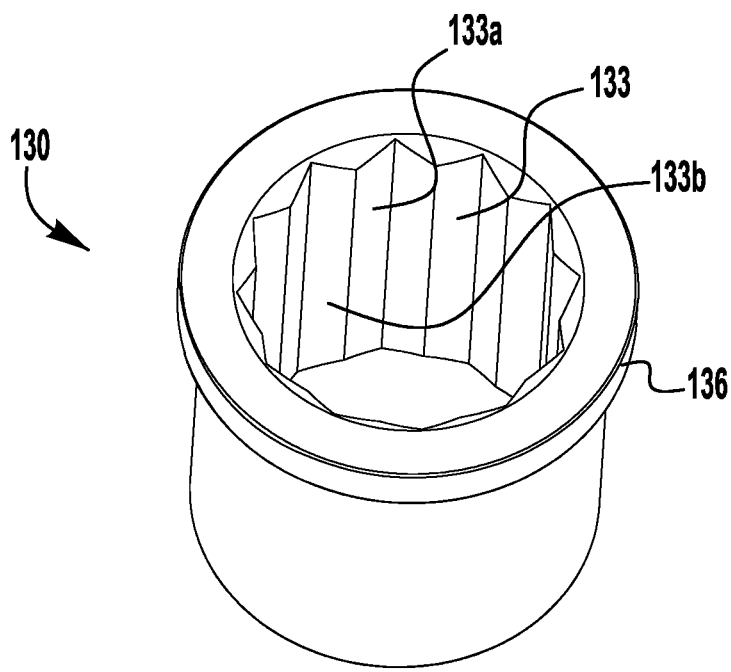
FIG. 4
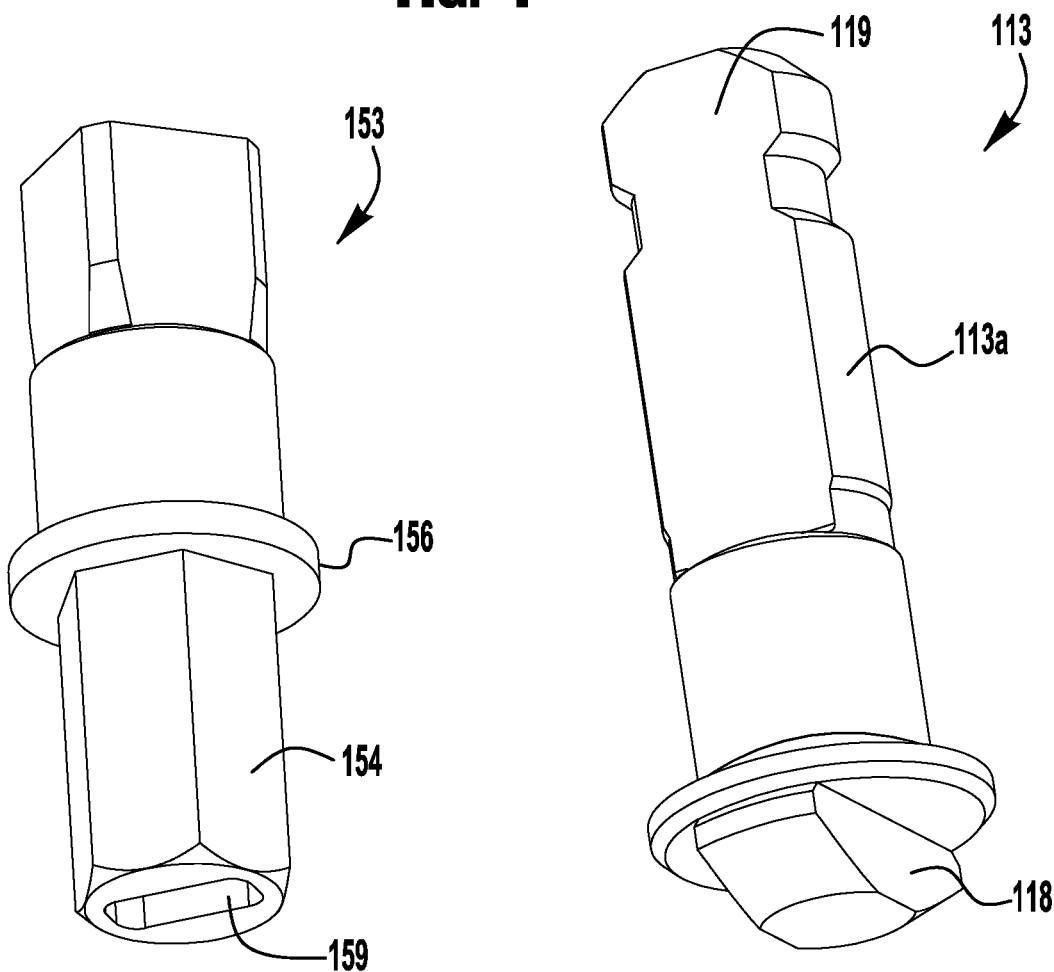
FIG. 5             FIG. 6

NUT LOCKING COUPLING FOR ACTUATED VALVE

CROSS-REFERENCE TO RELATED APPLICATION

This application claims priority to and all benefit of U.S. Provisional Patent Application Ser. No. 62/842,120, filed on May 2, 2019, entitled NUT LOCKING COUPLING FOR ACTUATED VALVE, the entire disclosure of which is incorporated herein by reference.

BACKGROUND

Flow control devices such as rotary valves, for example, typically have a rotatable actuator stem that is sealed against fluid system pressure to prevent external or shell leakage past the stem. Stem seals or stem packing components are often compressed or loaded into sealing engagement between the actuator stem and a stem receiving bore in the valve body by a threaded nut tightened against an upper portion (e.g., counterbore) of the valve body.

In rapid or high cycle applications, or in valves exposed to vibration, the actuator stem nut may tend to loosen or back off of the stem sealing components, which may result in leakage past the stem and increased wear of the stem sealing components.

SUMMARY

According to an aspect of the present disclosure, an actuated valve assembly includes a valve, an actuator, and a nut retention sleeve. The nut retention sleeve has a first bore portion sized to closely receive and rotate with a portion of a coupling member extending from the actuator and a second bore portion sized to closely receive and rotate with at least a portion of a stem nut assembled with a valve stem of the valve. The nut retention sleeve is slideable between a nut retaining position in which the second bore portion engages the stem nut to rotationally fix the stem nut with the coupling member, and a nut adjusting position in which the second bore portion is disengaged from the stem nut to permit rotation of the stem nut on the valve stem.

According to another aspect of the present disclosure, a method of selectively adjusting a stem nut of an actuated valve assembly is contemplated for an actuated valve assembly including a valve having a threaded valve stem and an actuator having a coupling member in coupling engagement with the valve stem for co-rotation therewith. In the exemplary method, a nut retention sleeve is provided in a nut retaining position installed over and rotationally fixed with portions of the coupling member and the stem nut, thereby rotationally fixing the stem nut with the coupling member. The nut retention sleeve is slid to a nut adjusting position in which the nut retention sleeve is disengaged from the stem nut. The stem nut is adjusted on the valve stem to a desired position. The nut retention sleeve is slid back to the nut retaining position to secure the stem nut in the desired position.

BRIEF DESCRIPTION OF THE DRAWINGS

Further advantages and benefits will become apparent to those skilled in the art after considering the following description and appended claims in conjunction with the accompanying drawings, in which:

FIG. 4 is a perspective view of the nut retention sleeve of the arrangement of FIG. 3A;

FIG. 5 is a perspective view of the actuator coupling member of the arrangement of FIG. 3A; and FIG. 6 is a perspective view of the valve stem of the arrangement of FIG. 3A.

DETAILED DESCRIPTION

Figure 1:
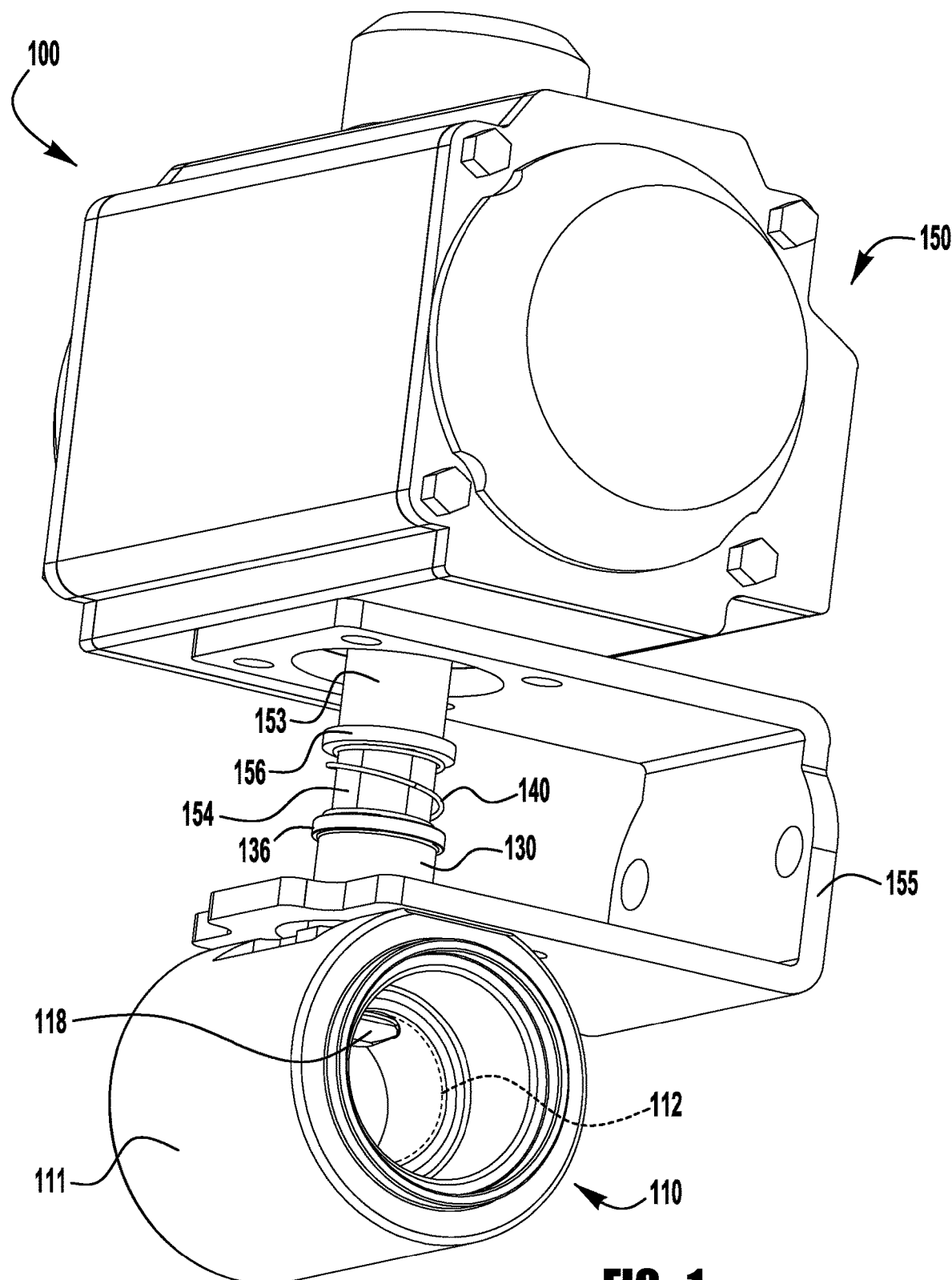
FIG. 1 is a perspective view of an actuated valve assembly, according to an exemplary embodiment of the present disclosure.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the illustrated exemplary embodiments include pneumatic actuated rotary valve assemblies, in other embodiments, other types of valves (e.g., reciprocating or axially actuated valves, such as bellows or diaphragm valve) or actuators (e.g., electric actuators or manual actuators) may be utilized.

According to an aspect of the present disclosure, an actuated valve assembly having an actuator operated valve stem secured with a valve body by a stem nut may be provided with a nut retention sleeve installed over at least a portion of the stem nut and an actuator operated coupling member. The nut retention sleeve may be provided with a first bore portion sized to closely receive and rotate with the coupling member and a second bore portion sized to closely receive and rotate with the stem nut. The nut retention sleeve is slideable between a nut retaining position in which the second bore portion engages the stem nut to rotationally fix the stem nut with the coupling member, and a nut adjusting position in which the second bore portion is disengaged from the stem nut to permit rotation of the stem nut on the valve stem.

Figure 2:
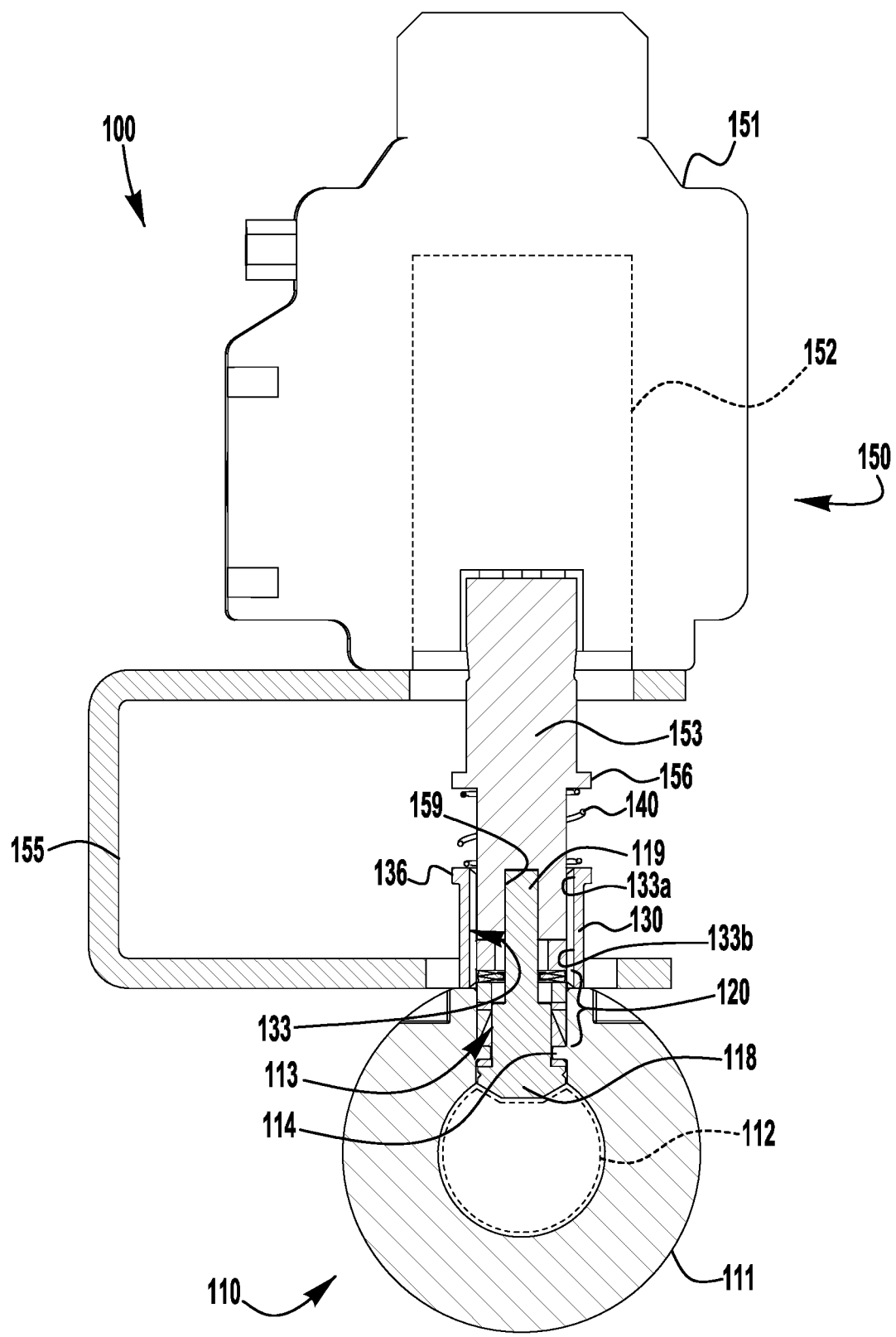
FIG. 2 is a side cross-sectional view of the actuated valve assembly of FIG. 1.

FIGS. 1 and 2 illustrate an exemplary actuated valve assembly 100 including a valve 110 and an actuator 150. While many different types of valves and actuator may be utilized, in the illustrated embodiment, the valve 110 is a rotary ball valve (e.g., a quarter turn shutoff valve), and the actuator 150 is a rotary pneumatic actuator.

Figure 3A:
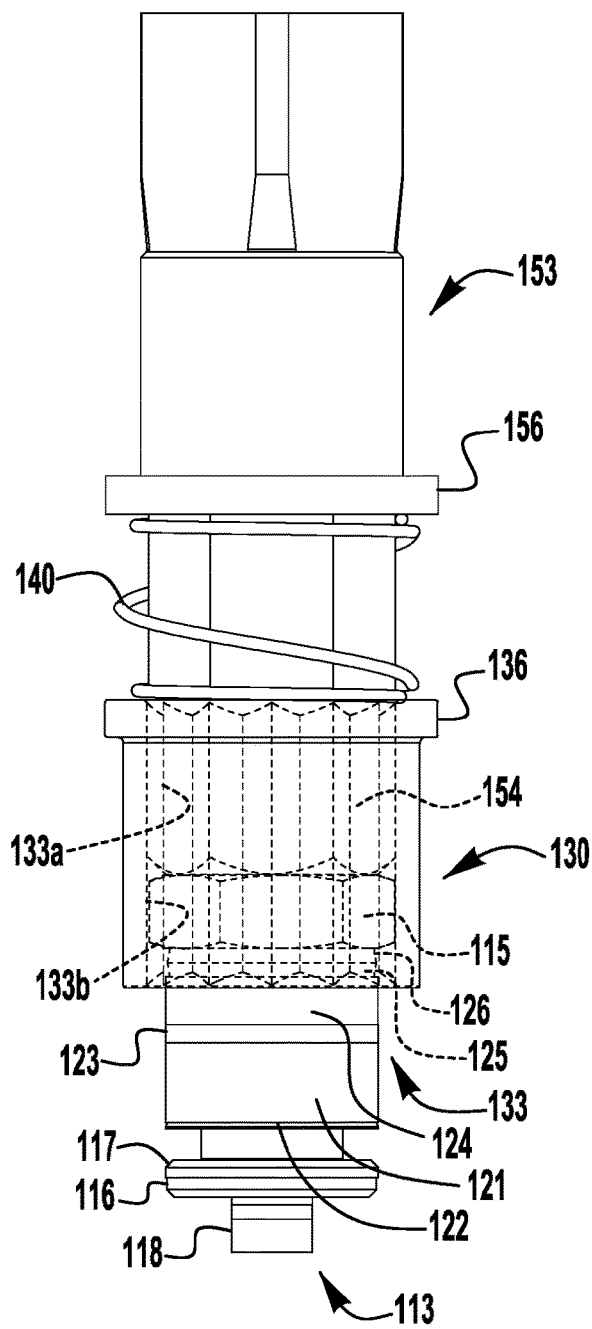
FIG. 3A is a perspective view of an actuator stem coupling arrangement according to an exemplary embodiment of the present disclosure, with the nut retention sleeve in the nut retaining position and shown in phantom to illustrate additional features of the arrangement.
Figure 3B:
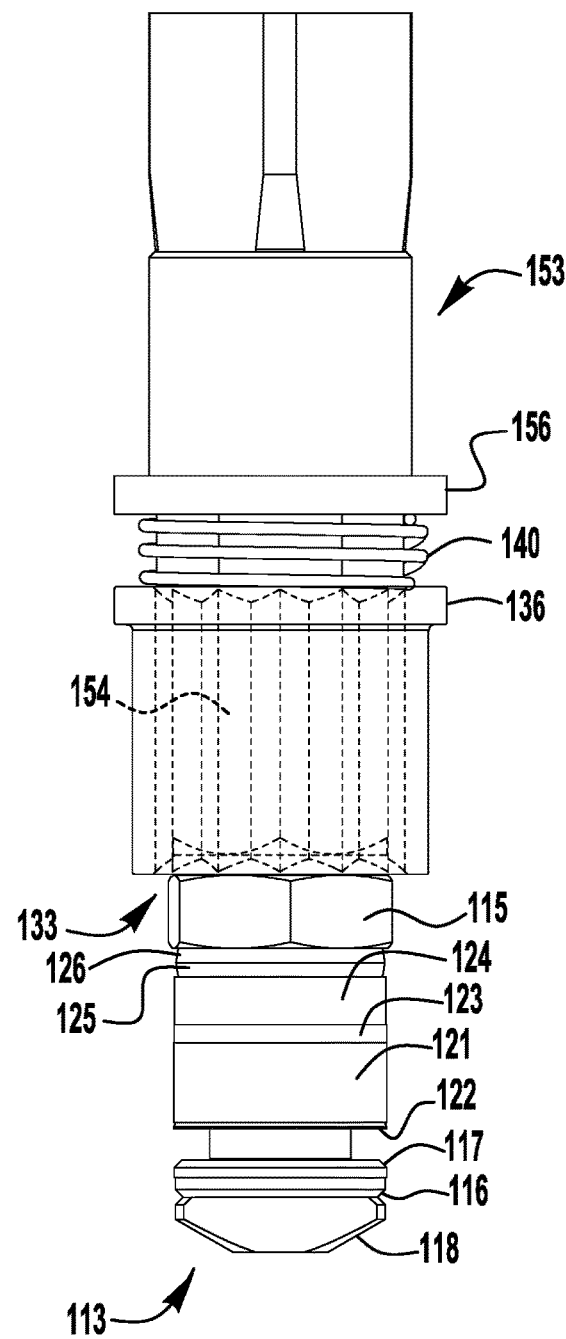
FIG. 3B is a perspective view of the actuator stem coupling arrangement of FIG. 3A, with the nut retention sleeve in the nut adjusting position and shown in phantom to illustrate additional features of the arrangement.
Figure 3C:
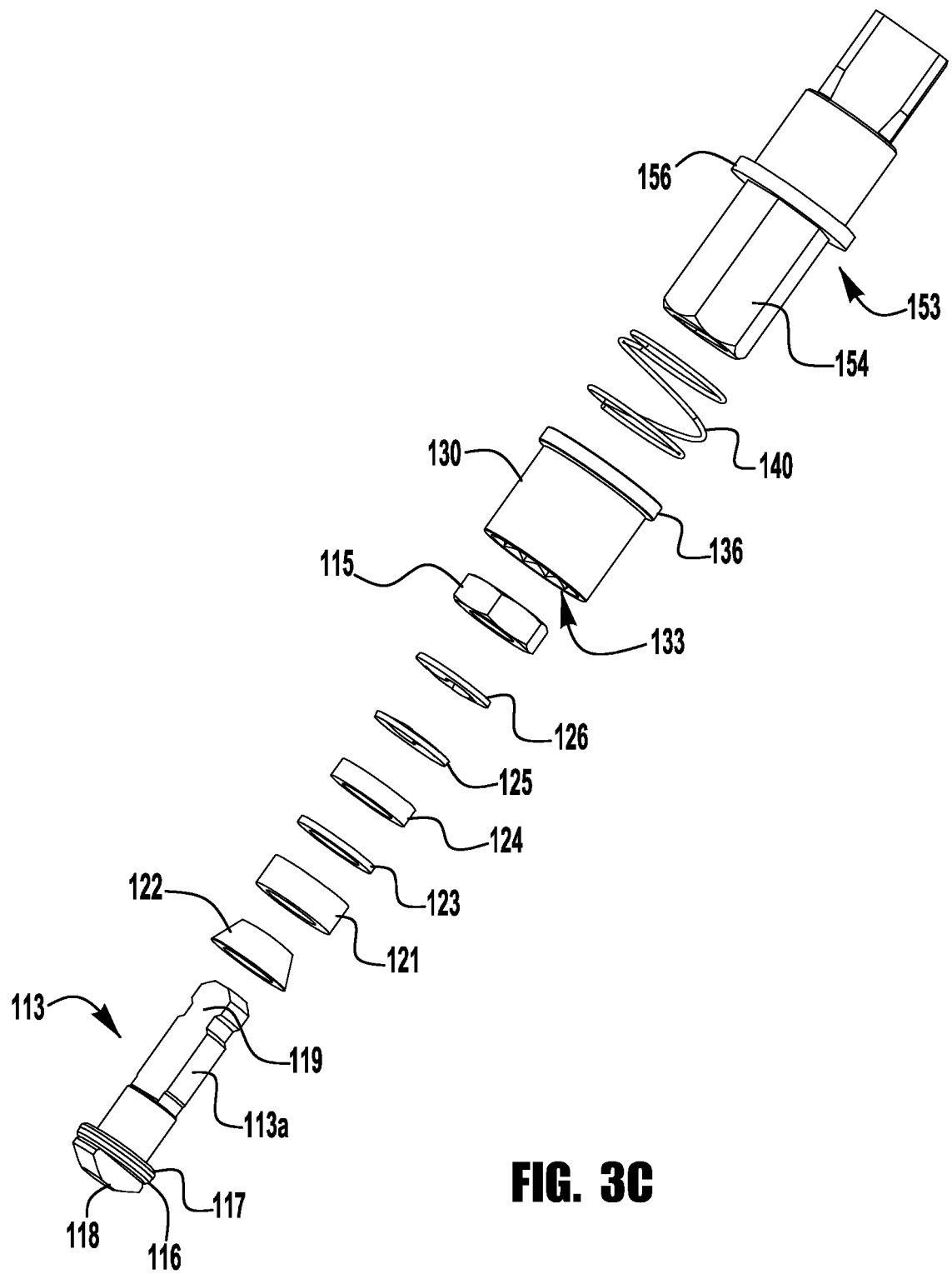
FIG. 3C is an exploded perspective view of the actuator stem coupling arrangement of FIG. 3A.

The exemplary valve 110 includes a valve body 111 and a valve element 112 (e.g., ball) disposed in the valve body, together defining a flow path through the valve. The valve element 112 is operatively connected with an internal end of a valve stem 113, which extends through a stem bore 114 in the valve body 111. A female threaded stem nut 115 is threadably assembled with a threaded portion 113a (FIG. 6) of the valve stem 113 and is tightened against a stem sealing arrangement 120 (e.g. upper and lower packing members 121, 122, packing support 123, gland 124, and Belleville spring washers 125, 126, as best shown in FIG. 3C) to effect a seal between the valve stem 113 and the stem bore 114. Stem bearings 116, 117 may be provided on the stem 113 between the valve body 111 and the ball engaging tang 118 of the valve stem 113 to facilitate smooth rotary actuation of the valve stem with respect to the valve body 111.

The actuator 150 includes a housing 151 retaining a rotary output mechanism (shown schematically at 152 in FIG. 2) and a coupling member 153 operatively connected to the rotary output mechanism 152 and extending from the housing 151 and into coupling engagement with the valve stem 113 for co-rotation therewith. Many different rotary output mechanisms may be utilized, including, for example, a pneumatically actuated piston driving a rack gear for geared rotation of the coupling member 153. As shown, the valve body 111 may be secured to the actuator 150 by a mounting bracket 155, for example, to provide additional support for the actuator 150.

While many different types of coupling engagement may be provided between the coupling member and the valve stem, in the illustrated embodiment, an upper flatted portion 119 of the valve stem 113 is received in a corresponding slot 159 in the coupling member 153, as evident in FIG. 2.

To secure the stem nut 115 in a tightened condition, and against loosening on the valve stem 113 (e.g., due to rapid actuation, high cycles, or system vibrations), a nut retention sleeve 130 is installed over, and rotationally fixed with (e.g., using keyed or interlocking bore portions in the sleeve) portions of the coupling member 153 and stem nut 115, thereby rotationally fixing the stem nut with the coupling member, which is in turn rotationally fixed with the valve stem, as described above. The rotationally fixed condition of the coupling member 153 and the stem nut 115 may also provide more exact alignment of the coupling member and valve stem 113, for example, where gaps between the stem flatted portion 119 and the coupling member slot 159 would otherwise allow for minor rotational misalignment or play between the two components.

To provide rotationally fixed engagement of the nut retention sleeve with the coupling member and stem nut, the sleeve may include a first (e.g., upper) bore portion sized to closely receive and rotate with the coupling member, and a second (e.g., lower) bore portion sized to closely receive and rotate with the stem nut. In the illustrated embodiment, the nut retention sleeve 130 includes a uniform shaped bore 133 having a first (e.g., upper) bore portion 133a sized to closely receive and rotate with the coupling member 153, and a second (e.g., lower) bore portion 133b sized to closely receive and rotate with the stem nut 115. In other embodiments, the upper and lower bore portions may be non-uniform (e.g., having a different cross-sectional size and/or shape), for example, to accommodate differently shaped coupling members and stem nuts. In the illustrated example, the sleeve bore 133 is a twelve-point or bi-hex bore sized to closely receive and rotate with a hex shaped portion 154 of the coupling member 153 and with the hex shaped stem nut 115. The twelve-point shape of the sleeve bore 133 allows for minor degrees of rotational adjustment of the stem nut 115 with respect to the valve stem 113 and coupling member 153 (i.e., allowing for rotational offset of the hex flats of the stem nut and coupling member), for example, to tighten the stem nut to a desired packing torque.

In another embodiment (not shown), the valve stem may be provided with a portion (e.g., integral or installed so as to be rotationally fixed with the stem, such as by a splined connection) shaped to interlock with a first bore portion of the nut retention sleeve to directly rotationally fix the valve stem and stem nut without engaging an actuator coupling member.

To allow for adjustment of the stem nut 115 on the actuated valve assembly 100, the nut retention sleeve 130 may be slid or otherwise moved (e.g., by a user applied axial pulling or pushing force against a biasing spring) from a nut retaining position (FIG. 3A) in which the second bore portion 133b is engaged with at least a portion of the stem nut, to a nut adjusting position (FIG. 3B), in which the second bore portion 133b is disengaged from the stem nut. In the nut adjusting position of the nut retention sleeve 130, the stem nut 115 may be adjusted on the valve stem 113 (e.g., tightened or loosened). When the stem nut is adjusted to a desired position (e.g., based on a desired torque), the nut retention sleeve 130 may be slid back to the nut retaining position, with the second bore portion 133*b* re-engaging the stem nut 115 to secure the stem nut in the adjusted position.

To facilitate maintenance of the nut retention sleeve 130 in the nut retaining position, a biasing member (e.g., compression spring 140) may be provided between the coupling member 153 and the nut retention sleeve 130 to bias the nut retention sleeve toward the nut retaining position. In the illustrated embodiment, a biasing spring 140 is disposed between a flange 156 on the coupling member 153 (e.g., above and adjacent to the hex-shaped portion 154) and an upper lip 136 on the nut retention sleeve 130. In other embodiments, other spring engaging portions may be provided. In still other embodiments, other arrangement may additionally or alternatively be used to maintain the nut retention sleeve in the nut retaining position, including, for example, detents or magnets, which may also selectively hold the nut retention sleeve in the nut adjusting position, for example, to facilitate adjustment.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof

We claim:

1. An actuated valve assembly comprising;
    a valve comprising a valve body, a valve element disposed within the valve body and rotatable between first and second positions, a valve stem operatively connected with the valve element and extending through a stem bore in the valve body, and a stem nut assembled with the valve stem external to the valve body;
    an actuator comprising a housing retaining a rotary output mechanism and a coupling member operatively connected to the rotary output mechanism and extending from the housing and into coupling engagement with the valve stem for co-rotation therewith; and
    a nut retention sleeve having a first bore portion sized to closely receive and rotate with a portion of the coupling member, and a second bore portion sized to closely receive and rotate with at least a portion of the stem nut;
    wherein the nut retention sleeve is slideable between a nut retaining position in which the second bore portion engages the stem nut to rotationally fix the stem nut with the coupling member, and a nut adjusting position in which the second bore portion is disengaged from the stem nut to permit rotation of the stem nut on the valve stem.

2. The assembly of claim 1, wherein the first bore portion is substantially uniform and continuous with the second bore portion.

3. The assembly of claim 1, wherein at least one of the first and second bore portions comprises a twelve-point hex bore.

4. The assembly of claim 1, further comprising a biasing member positioned to bias the nut retention sleeve to the nut retaining position.

5. The assembly of claim 4, wherein the biasing member comprises a compression spring having a first end that engages the coupling member and a second end that engages the nut retention sleeve.

6. The assembly of claim 5, wherein the biasing spring is disposed between a flange on the coupling member and a lip on the nut retention sleeve.

7. The assembly of claim 1, wherein the portion of the coupling member is hex-shaped.

8. The assembly of claim 1, wherein a flatted end portion of the valve stem is received in a corresponding shaped slot in the coupling member to maintain the coupling engagement of the coupling member with the valve stem.

9. The assembly of claim 1, wherein the actuator housing is secured to the valve body by a mounting bracket.

10. The assembly of claim 9, wherein the mounting bracket is a U-shaped mounting bracket having a first side wall affixed to the actuator housing and a second side wall affixed to the valve body, with the nut retention sleeve being disposed between the first and second side walls.

11. The assembly of claim 10, wherein at least a portion of the nut extends past the second side wall of the mounting bracket for user access when the nut retention sleeve is moved to the nut adjusting position.

12. The assembly of claim 1, wherein the actuator comprises a pneumatic actuator.

13. The assembly of claim 1, wherein the valve is a quarter turn valve.

14. The assembly of claim 1, wherein the valve is a ball valve.

15. The assembly of claim 1, wherein the valve further comprises a stem sealing arrangement installed in the stem bore, wherein the stem nut is tightened against the stem sealing arrangement to effect a seal between the valve stem and the stem bore.

16. A method of selectively adjusting a stem nut of an actuated valve assembly, the actuated valve assembly including a valve having a threaded valve stem and an actuator having a coupling member in coupling engagement with the valve stem for co-rotation therewith, the method comprising:
    providing a nut retention sleeve in a nut retaining position installed over and rotationally fixed with portions of the coupling member and the stem nut, thereby rotationally fixing the stem nut with the coupling member;
    sliding the nut retention sleeve to a nut adjusting position in which the nut retention sleeve is disengaged from the stem nut;
    adjusting the stem nut on the valve stem to a desired position; and
    sliding the nut retention sleeve back to the nut retaining position to secure the stem nut in the desired position.

17. The method of claim 16, wherein sliding the nut retention sleeve to the nut adjusting position comprises applying an axial force against a biasing spring disposed between the coupling member and the nut retention sleeve.

18. The method of claim 16, wherein sliding the retention sleeve back to the nut retaining position comprises receiving a hex shaped portion of the stem nut with a hex shaped bore in the nut retention sleeve.

19. The method of claim 16, wherein the actuator comprises a pneumatic actuator.

20. The method of claim 16, wherein the valve is a quarter turn valve.

* * * * *